United States Patent Office 3,378,572
Patented Apr. 16, 1968

3,378,572
CHLORINATION OF ANTHRAQUINONE-SULFONIC ACIDS USING NASCENT CHLORINE AND AN INORGANIC AMMONIUM SALT (ADDED SLOWLY) IN DILUTE SULFURIC ACID
Richard S. Wilder, Penns Grove, N.J., assignor to E. I. du Pont de Nemours and Company, Wilmington, Del., a corporation of Delaware
No Drawing. Filed Jan. 28, 1964, Ser. No. 340,779
11 Claims. (Cl. 260—384)

ABSTRACT OF THE DISCLOSURE

Chlorination of anthraquinone sulfonic acids and alkali metal salts thereof to the corresponding chloroanthraquinones by reaction with nascent chlorine in the presence of dilute sulfuric acid and an inorganic ammonium salt.

Background of the invention

The present invention is directed to an improved process for the oxidative chlorination of anthraquinonesulfonic acids or their alkali metal salts to corresponding chloroanthraquinones.

Chloro derivatives of anthraquinones have been widely used for the synthesis of compounds comprising the presently known fast dyes for cellulose and synthetic fibers. As such they are important industrial materials.

A well known reaction for preparing chloroanthraquinones that has been used for many years in manufacturing processes is the replacement of the sulfo groups on anthraquinonesulfonic acids by nascent chlorine (chlorine generated from a boiling mixture of a chlorate and chloride ion yielding material). Although this reaction is readily performed in small scale laboratory equipment, certain reaction conditions which do not cause serious problems in the laboratory create serious problems when this reaction is carried out in large scale manufacturing equipment. One such condition is the inability to adequately agitate and mix the reactants in large scale equipment. Another condition which is greatly magnified in large manufacturing equipment is the poisoning effect of certain metal salts, such as manganese chloride. In large equipment, as contrasted with laboratory equipment, there is an increased opportunity for such impurities to enter the reaction mixture and poison the reaction. Such poisoning of the reaction by these known inhibitors greatly increase the reaction time (see Ind. Engr. Chem., vol. 46, No. 6, 1155 (1954)). Hence, whereas in the laboratory, where adequate mixing and other conditions allow the reaction to be completed in a matter of hours, the process generally requires at least two or more days in large scale equipment. This increased reaction time in large equipment creates a serious health hazard since the process liberates chlorine during this prolonged period. This increased time also wastes valuable starting materials since, due to the interaction of the many variables in this reaction, it is difficult to determine the proper time to add the various materials. Hence, it has been generally held that the magnitude and the number of problems involved in the large scale manufacture of chloroanthraquinones can be effectively reduced whenever a technique is discovered which reduces significantly the required completion time for this reaction.

The following representative reaction equations, using NaCl and HCl to provide the chloride ion for the generation of nascent chlorine, illustrate the oxidative chlorination reactions presently employed in industry. Aq represents the anthraquinone nucleus, which may be substituted with groups such as nitro, sulfo or chloro:

(1) $3Aq\text{-}SO_3Na + 3H_2SO_4 + 2NaCl + NaClO_3 \rightarrow 3Aq\text{-}Cl + 6NaHSO_4$ (2) $3Aq\text{-}SO_3Na + H_2SO_4 + 2HCl + NaClO_3 \rightarrow 3Aq\text{-}Cl + 4NaHSO_4$ In a recent article by N. S. Dokunikhin and L. M. Egorova, published in Org. Poluprod. i Krasiteli, Nauch.-Issledovatel. Inst. Org. Poluprod. i Krasitelei im. K. E. Voroshilova, Sbornik Statei No. 1, pp. 72–82 (1959), a study was made of the reaction between 1-anthraquinonesulfonic acid and chlorine gas in the presence of certain compounds as reaction initiators. This article revealed that when 0.1 mole of ammonium chloride per mole of potassium 1-anthraquinonesulfonate is used as an initiator in this reaction, the yield of 1-chloroanthraquinone is increased from 26.5% to 97.8%. The article further states that the yield is increased to a lesser degree with the nascent chlorine process than with the gaseous chlorine process. When 0.1 mole of ammonium chloride per mole of potassium 1-anthraquinonesulfonate was added with potassium chlorate to a boiling mixture of the potassium 1-anthraquinonesulfonate and 27% hydrochloric acid, the yield was increased only from 37.9% to 43.3%.

A later article by V. V. Kozlov and A. A. Davydov, published in Zhurnal Obshchei Khimii, vol. 30, No. 10, pp. 3456–3464 (1960) [Chem. Abstracts, 55, 22264 (1961)], described the effect of the chlorides of such metals as Na, K, Ca, Mg and Al as initiators on the oxidative chlorination process. It was discovered that these chlorides either exert no effect or favor a small increase in the yield of 1-chloroanthraquinone. The article further discloses that when 0.02 mole of ammonium chloride, 0.004 mole of potassium 1-anthraquinonesulfonate, and 0.0073 mole of potassium chlorate were heated for one hour at 101° C. in 200 ml. of 11% hydrochloric acid, the yield of chloroanthraquinone was 56.61% as compared with a yield of 56.88% when the ammonium chloride was not used.

Although both articles hereinbefore mentioned describe generally the effect of many variables including $NH_4Cl$ on the chlorination process of anthraquinonesulfonic acids, the effect of $NH_4Cl$ in the nascent chlorine process is still unclear. In fact, despite the great importance of this reaction for the production of chloroanthraquinones, the technique of oxidative chlorination of anthraquinones is not yet fully known. Many of the disadvantages of this process in large scale manufacturing equipment heretofore mentioned still exist and continue to create health hazards and waste valuable starting materials.

Description of the invention

It is, therefore, an object of the present invention to reduce significantly the time required to effect the oxidative chlorination of anthraquinonesulfonic acids in manufacturing equipment.

It is a further object of the present invention to provide an oxidative chlorination process for preparing chloroanthraquinones which efficiently utilizes the chlorate and chloride starting materials and accordingly reduces to a minimum the quantity of free chlorine which escapes from the reaction.

These and other objects will become apparent from the following description and claims.

More particularly, the present invention is directed to a process for the manufacture of a chloroanthraquinone which process comprises heating an anthraquinonesulfonic acid in dilute sulfuric acid to a temperature of from 98° C. to the boiling point of the mixture, and slowly adding to said mixture from 0.5 to 3%, based on the weight of the anthraquinonesulfonic acid, of an inorganic ammonium salt selected from the group consisting of ammonium chloride ammonium nitrate, and ammonium sulfate, while simultaneously generating nascent chlorine in the reaction mixture, and recovering from the mixture the resulting chloroanthraquinone.

A preferred embodiment of the present invention is directed to the improvement in a process of chlorinating an anthraquinonesulfonic acid in a hot, dilute sulfuric acid medium in the presence of chloride ions, a chlorate and an ammonium salt, which improvement comprises adding slowly a hydrochloric acid solution containing 0.5 to 3%, based on the weight of the anthraquinonesulfonic acid, of ammonium chloride, ammonium nitrate or ammonium sulfate to a mixture consisting of an anthraquinonesulfonic acid and a chlorate in 5 to 25% sulfuric acid maintained at a temperature of from 98° C. to the boiling point of said mixture.

It has recently been discovered that the catalytic effect of $NH_4Cl$ on the oxidative chlorination process of anthraquinonesulfonic acid is negligible when all the $NH_4Cl$ is added at the start of the reaction. In this respect, it has been found that the catalyst $NH_4Cl$ can best be utilized when added slowly throughout the duration of the reaction. Utilizing the process of the present invention in plant equipment, this reaction time has been reduced to about 8 hours. It has also recently been discovered that reaction times are reduced and yields increased when the $NH_4Cl$ catalyst is used in a system of strong acidity accomplished by mixed acids. It has been further found that this acidity can be maintained by means of $H_2SO_4$ and that the concentration of this acid in the chlorination mass is critical upon the effect that the $NH_4Cl$ catalyst has on the oxidative chlorination reaction. The critical concentration range of $H_2SO_4$ in the reaction mass is between about 5 and 25%. At concentrations above about 25% sulfuric acid a hazardous condition is created when sodium chlorate is added.

There are several advantages of the heretofore described novel process over previous commercial methods. The greatest advantage is the shorter chlorination times achieved in large-scale manufacturing equipment. Reaction time is generally reduced to about ¼ to ⅓ the time required by previous commercial methods. Another advantage is the more efficient utilization of chlorate and chloride, thereby reducing health hazards from escaping free chlorine. Another advantage of the present novel process is increased economy. By the efficient utilization of chlorate, the chlorate usage is reduced by about 50%. Finally, the present process greatly increases the yields of chloroanthraquinones in shorter chlorination times, which improvement is particularly pronounced in large scale equipment where yields are generally low unless reaction times are greatly prolonged.

Although the effect of the present process is more pronounced in large scale equipment, the time advantage of the present process is also significant in controlled laboratory reactions where efficient mixing is possible. In laboratory scale equipment the reaction time can be reduced from about 8–12 hours to between 3 to 6 hours by using ammonium chloride. Laboratory chlorinations of anthraquinonesulfonic acids are useful for analytical purposes.

The anthraquinonesulfonic acids which can be utilized in the present invention include both the alpha and beta sulfonic acids. The preferred starting materials are the anthraquinonesulfonic acids which contain a sulfo group in the alpha position. Mono- and disulfoanthraquinones are used, as well as mono-sulfoanthraquinones which carry a nitro group. Equivalent starting materials which also can be utilized in the present process are the beta chloro or bromo anthraquinones which are monosulfonated, or the monosulfonated alpha chloro anthraquinones, e.g. 2-chloro(or bromo)-5-anthraquinonesulfonic acid, 2-chloro(or bromo)-8-anthraquinonesulfonic acid or the isomeric monosulfonation products of 1-chloroanthraquinone. From these materials, the corresponding dichloro- or bromochloroanthraquinones are obtained. The alkali metal salts of the anthraquinonesulfonic acids may also be employed in the present process. The sodium or potassium anthraquinone sulfonates are preferred.

Ammonium chloride is the preferred catalyst. Ammonium nitrate and ammonium sulfate have been used in the place of ammonium chloride and all these ammonium salts show definite advantages in that they increase the rate of chlorination. Ammonium sulfate shows about half the improvement shown by ammonium chloride, while ammonium nitrate is superior to ammonium sulfate.

It is presumed that the ammonium chloride catalyst functions by being converted to $NCl_3$ which, at about 100° C., is decomposed at once to atomic nitrogen and chlorine. It is essential, therefore, that the ammonium salt be added slowly to the chlorination mass in order to effect maximum economy in the utilization of chlorine. Distinct improvements in reaction rates have been observed in the present process when only 0.5% of ammonium salt, based on the weight of the anthraquinonesulfonic acid, is employed. The preferred amount of catalyst is from 0.5% to 3% of ammonium salt based on the weight of the anthraquinonesulfonic acid. Larger amounts may be employed but are not required and are wasteful.

The chlorate used in the present invention may be either $NaClO_3$ or $KClO_3$.

The following representative examples illustrate the operation of the present invention. All parts are by weight unless otherwise specified.

Example I (A) Seventy-eight parts of the sodium salt of 1-anthraquinonesulfonic acid, 700 parts of water and 115 parts of 98% sulfuric acid were thoroughly mixed in a glass flask. A solution consisting of 20 parts of sodium chlorate and 80 parts of water was then added to the mixture. The slurry was heated to boiling (about 101° C.) and a solution consisting of 75 parts of 30% hydrochloric acid and 0.75 part of ammonium chloride was added uniformly to the boiling slurry over a period of 4 hours. The slurry was then filtered and the 1-chloroanthraquinone washed acid-free with hot water. The product 1-chloroanthraquinone was subsequently dried. The yield of product was 60.8 parts, or 99.7% of the theoretical yield.

(B) When the above procedure of part A was repeated with the exception that the ammonium chloride addition was omitted, 53.8 parts of 1-chloroanthraquinone were obtained which is 88.1% of the theoretical yield.

(C) When the process of part A above was conducted in full scale manufacturing equipment it was necessary to extend the time of chlorination because the chlorination reaction proceeded at a slower rate. Accordingly, addition of the hydrochloric acid-ammonium chloride solution was extended to eight hours, and a similar yield was obtained.

(D) When the procedure of part C above was repeated with the exception that ammonium chloride was not added to the reaction, the time required to complete the chlorination was 50 to 100% longer.

Example II (A) Sodium chlorate (as 20% solution), in the amount of 23.7 parts was added to a thoroughly mixed reaction mass consisting of 87.4 parts of the sodium salt of the mixed isomeric 1,5- and 1,8-anthraquinonedisulfonic acids (prepared by the disulfonation of anthraquinone in the presence of a mercury catalyst by well-known methods), 115 parts of 98% sulfuric acid, and 700 parts of water. A solution consisting of 101.4 parts of 30% hydrochloric acid and 1 part of ammonium chloride was prepared in a separate vessel. 5.4 parts of this solution was added to the slurry of anthraquinonesulfonic acids. The slurry was then heated to the boil and the remainder of the hydrochloric acid-ammonium chloride solution was added uniformly to the boiling slurry over a period of 4 hours. The resulting mixture of 1,5- and 1,8-dichloroanthraquinones was filtered off, washed acid free, and dried. The yield of the product was 55.5 parts or 94.8% of the theoretical yield.

(B) When the above procedure of part A of this example was repeated, with the exception that the ammonium chloride was not added to the reaction, the yield was 48 parts or 81.7% of theory.

(C) When 87.4 parts of 1,5-anthraquinonedisulfonic acid were used in the above procedure of part A in the place of the mixed isomeric 1,5- and 1,8-anthraquinonedisulfonic acids, an excellent yield of 1,5-dichloroanthraquinone was obtained.

(D) When the process of part A of this example was repeated, except that the HCl-NH$_4$Cl solution was replaced by a solution consisting of 200 parts of water, 50 parts of NaCl and 1 part of ammonium chloride, and the 115 parts of 98% sulfuric acid were increased to 200 parts, similar results were obtained.

Example III (A) A salt solution was prepared by dissolving 85 parts of sodium chloride, 30 parts of sodium chlorate and 1.15 parts of ammonium chloride in 400 parts of water. Fifty parts of the salt solution thus prepared were added to a solution of 38.4 parts of 1-nitro-8-anthraquinonesulfonic acid in 1550 parts of 25% sulfuric acid. The solution was heated to the boil (102°–104° C.). After boiling for one-half hour the remainder of the salt solution was added slowly and uniformly to the boiling reaction mixture over a period of four hours. The slurry was then cooled to about 85° C. and filtered. The product 1-chloro-8-nitroanthraquinone was washed thoroughly with hot water and dried. The yield was 33.2 parts, the theoretical yield.

(B) When ammonium chloride was omitted from the salt solution used in part A of this example, the yield obtained was 30.7 parts (92.5% theory).

(C) when 38.4 parts of a mixture of 1-nitro-5 and 8-anthraquinonesulfonic acids (as obtained by nitrating 1-anthraquinonesulfonic acid by well-known methods) were used in the procedure of Part A in the place of 1-nitro-8-anthraquinonesulfonic acid, an excellent yield of a mixture of 1-chloro-5 and 8-nitroanthraquinones was obtained.

(D) When the 38.4 parts of 1-nitro-8-anthraquinonesulfonic acid used in the procedure of part A were replaced by 38.4 parts of 1-nitro-5-anthraquinonesulfonic acid, an excellent yield of 1-chloro-5-nitroanthraquinone was obtained.

(E) When the processes of parts A, C and D of this example were conducted in full scale manufacturing equipment it was necessary to extend the time of chlorination because the chlorination reaction proceeded at a much slower rate than it did in laboratory glass equipment. Accordingly, addition of the salt solution of sodium chloride, sodium chlorate and ammonium chloride was extended to 12 hours, and similar yields were obtained. When ammonium chloride was not used in these reactions on a plant scale, the time required to complete the chlorinations was about 2 to 3 days and considerably increased amounts of chloride and chlorate were required.

It will be understood by one skilled in the art that chemically equivalent amounts of KCl and/or KClO$_3$ may be used in this example in the place of NaCl and/or NaClO$_3$ to obtain similar results.

Example IV (A) 1-anthraquinone sodium sulfonate (100% basis), in the amount of 80 parts, was mixed with 700 parts of water and 115 parts of 98% sulfuric acid. After stirring for about one-half hour, 91.4 parts of 30% hydrochloric acid were added and the slurry heated to boiling (100°–103° C.). As the boiling continued, a solution of 20 parts of sodium chlorate and 1 part of ammonium chloride in 100 parts of water was added slowly and uniformly over a period of 4 hours. At the end of this time the hot slurry was filtered and the 1-chloroanthraquinone washed acid free with hot water and dried. The yield of the product was 58.0 parts or 95% of the theoretical yield.

(B) When the ammonium chloride was not added in the procedure of part A of this example, the yield was 48.6 parts, or 79.6% of the theoretical yield.

(C) When the procedure of part A of this example was repeated with the exception that the 1 part of ammonium chloride was replaced by 2 parts of ammonium nitrate or with 2 parts of ammonium sulfate, similar results were obtained.

The rate of chlorination in the present invention is believed to be dependent on the rates of two different reactions occurring simultaneously. One depends on the rate at which the anthraquinone nucleus consumes chlorine in the acid medium. The other depends on the rate at which nascent chlorine is generated. Hence, it is important that both reactions be kept in phase, i.e., the rate at which the anthraquinone nucleus is available should correspond with the generation of nascent chlorine. If chlorine is generated at a faster rate, it escapes to the atmosphere which results in a health hazard and loss of starting materials. In this respect, the generation of nascent chlorine must be controlled.

It has been discovered that if one of the essential ingredients for the generation of nascent chlorine is added slowly with the NH$_4$Cl, the generation and consumption of nascent chlorine can be effectively controlled. It is, therefore, preferred to add slowly to the reaction mixture the NH$_4$Cl in combination with either of the following: (a) the chloride ion yielding materials (the HCl or NaCl), (b) the chlorate or, (c) with NaCl and the chlorate. It is also preferred to add enough nascent chlorine generating materials to generate from about 150 to 250% of the theoretical amount of the nascent chlorine needed to replace all of the sulfo groups on the anthraquinonesulfonic acid. When ammonium chloride is not used as utilized in this invention, considerably larger quantities of nascent chlorine are required.

The controlled formation of nascent chlorine in the chlorination mass is illustrated in Examples I and II by the gradual addition of HCl and NH$_4$Cl to the combination of H$_2$SO$_4$ and NaClO$_3$. In Example II (D), NaCl and Nh$_4$Cl are added to a combination of sulfuric acid and chlorate. The same result is achieved in Example II by the gradual addition of a solution containing NaCl, NaClO$_3$ and NH$_4$Cl to the dilute H$_2$SO$_4$. And in Example IV, a solution of NaClO$_3$ and NH$_4$Cl is slowly added to the combination of H$_2$SO$_4$ and HCl.

Hence, it will be clear that any combination of these methods of addition may be employed so long as the ammonium salt, or most of it, is added slowly to the hot chlorination mass as illustrated in the examples. Thus, the HCl, whether introduced into the chlorination mass prior to chlorination at elevated temperatures or added slowly with the ammonium salt, may be replaced in part or entirely with NaCl to provide the necessary chloride ion in the dilute sulfuric acid.

It is to be understood that the preceding examples are representative and that said examples may be varied within the scope of the total specification, as understood by one skilled in the art, to produce essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

I claim:

1. A process for the manufacture of a chloroanthraquinone which process comprises heating an anthraquinone compound selected from the group consisting of anthraquinonesulfonic acids and alkali metal salts thereof in 5 to 25% sulfuric acid to a temperature of from 98° C. to the boiling point of said mixture, and slowly adding to said mixture from 0.5 to 3%, based on the weight of said anthraquinonesulfonic acid, of an inorganic ammonium salt selected from the group consisting of ammonium chloride, ammonium nitrate and ammonium sulfate while simultaneously generating nascent chlorine in the reaction mixture, and recovering from said mixture the resulting chloroanthraquinone.

2. A process for the manufacture of a chloroanthraquinone which process comprises heating a mixture containing an anthraquinone compound selected from the group consisting of anthraquinonesulfonic acids and alkali metal salts thereof and a chlorate in 5 to 25% sulfuric acid to a temperature of 98° C. to the boiling point of said mixture, and slowly adding to said mixture from 0.5 to 3%, based on the weight of the anthraquinonesulfonic acid, of an ammonium salt selected from the group consisting of ammonium chloride, ammonium nitrate and ammonium sulfate contained in a solution of a chloride-contaiinng compound selected from the group consisting of HCl and NaCl.

3. A process for the manufacture of a chloroanthraquinone which process comprises heating a mixture containing an anthraquinone compound selected from the group consisting of anthraquinonesulfonic acids and alkali metal salts thereof and hydrochloric acid in 5 to 25% sulfuric acid to a temperature of 98° C. to the boiling point of said mixture, and slowly adding to said mixture a chlorate and from 0.5 to 3%, based on the weight of anthraquinonesulfonic acid, of an ammonium salt selected from the group consisting of ammonium chloride, ammonium nitrate and ammonium sulfate.

4. A process for the manufacture of a chloroanthraquinone which process comprises heating a mixture containing an anthraquinone compound selected from the group consisting of anthraquinonesulfonic acids and alkali metal salts thereof and sodium chlorate in 5 to 25% sulfuric acid to a temperature of 98° C. to the boiling point of the mixture, and slowly adding to said mixture a solution of hydrochloric acid containing 0.5 to 3%, based on the weight of the anthraquinonesulfonic acid, of ammonium chloride.

5. A process for the manufacture of a chloroanthraquinone which process comprises heating a mixture of an anthraquinone compound selected from the group consisting of anthraquinonesulfonic acids and alkali metal salts thereof in 5 to 25% sulfuric acid to a temperature of 98° C. to the boiling point of said mixture, and slowly adding to said mixture a solution of sodium chloride and sodium chlorate containing 0.5 to 3%, based on the weight of the anthraquinonesulfonic acid, of ammonium chloride.

6. The process of claim 4 wherein the hydrochloric acid solution containing the ammonium chloride is added uniformly over a period of at least 4 hours.

7. The process of claim 4 wherein the anthraquinonesulfonic acid is 1-anthraquinonesulfonic acid.

8. The process of claim 4 wherein the anthraquinonesulfonic acid is 1,5-anthraquinonedisulfonic acid.

9. The process of claim 4 wherein the anthraquinonesulfonic acid is a mixture of 1,5- and 1,8-anthraquinonedisulfonic acids.

10. The process of claim 5 wherein the anthraquinonesulfonic acid is 1-nitro-8-anthraquinonesulfonic acid.

11. The process of claim 5 wherein the anthraquinonesulfonic acid is a mixture of 1-nitro-5-anthraquinonesulfonic acid and 1-nitro-8-anthraquinonesulfonic acid.

References Cited

Kozlov, V. V., et al., Zhurnal Obschchei Khimii, vol. 30, pp. 3456–3464 (English edition at pp. 3425–3431) (1969).

Gore, T. S., et al., Chemistry of Natural and Synthetic Coloring Matters, New York, Academic Press (1962), pp. 555–560.

LORRAINE A. WEINBERGER, *Primary Examiner.*

H. C. WEGNER, *Assistant Examiner.*